United States Patent

Yorganjian

[15] 3,671,881

[45] June 20, 1972

[54] RESETTABLE LOGIC GATE MULTIVIBRATOR

[72] Inventor: John James Yorganjian, West Palm Beach, Fla.

[73] Assignee: RCA Corporation

[22] Filed: Dec. 14, 1970

[21] Appl. No.: 97,797

[52] U.S. Cl. ................................331/57, 307/215, 307/291, 331/108 D, 331/113 R, 331/145

[51] Int. Cl. ........................................................H03k 3/282

[58] Field of Search ....................331/57, 108 D, 113 R, 135, 331/145; 307/215, 218, 269, 291

[56] References Cited

UNITED STATES PATENTS

| | | | |
|---|---|---|---|
| 3,341,788 | 9/1967 | Nishioka | 331/113 |
| 3,243,652 | 3/1966 | Meyer et al. | 307/215 X |
| 3,448,388 | 6/1969 | Krause | 307/215 X |

*Primary Examiner*—Roy Lake

*Assistant Examiner*—Siegfried H. Grimm

*Attorney*—H. Christoffersen

[57] ABSTRACT

A multivibrator circuit which can be selectively started and stopped in response to a control signal and in which phase and frequency relationships are maintained uniform and synchronized with the control signal.

6 Claims, 4 Drawing Figures

INVENTOR
JOHN JAMES YORGANJIAN
BY
J. Donald Weber, Jr.
ATTORNEY

INVENTOR.
JOHN JAMES YORGANJIAN
BY
G. Donald Weber, Jr.
ATTORNEY

RESETTABLE LOGIC GATE MULTIVIBRATOR

BACKGROUND OF THE INVENTION

There are many multivibrator circuits known in the art. Many of these multivibrators can be selectively switched by the application of a control signal thereto. However, these known multivibrators generally lose synchronization between the input control signal and the multivibrator output signal. As a result of the loss of synchronization, frequency and phase relationships between the input and output signals are destroyed. Moreover, the destruction of the synchronization may produce distortion of the multivibrator output signal train whereby errors may be introduced into other circuitry due to an ambiguous pulse condition.

SUMMARY OF THE INVENTION

In one embodiment of the invention, a plurality of gate circuits are connected together. The output of each of the gates is connected to an input of another gate, thereby forming a closed loop. Feedback circuits are provided around each of the gate circuits to affect the operation thereof. A suitable control means supplies a control signal to one of the gates whereby operation of the closed loop multivibrator circuit can be selectively altered. The output of the circuit is produced at the output of the gate to which the control signal is supplied.

DETAILED DESCRIPTION

Figure 1:
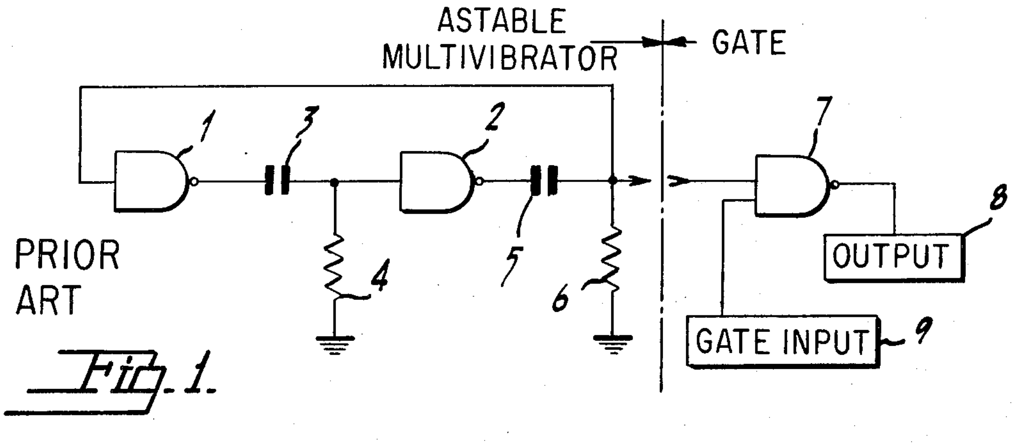
FIG. 1 is a block diagram of a controllable multivibrator circuit known in the art.

In the following description, similar reference numerals are ascribed to similar components in the several Figures.

Referring now to FIG. 1, there is shown a block diagram of a typical multivibrator circuit which is known in the art. This circuit is an astable multivibrator circuit which includes a selectively controlled output gate.

Gates 1 and 2 are connected as inverter networks. Specifically, these gates (as well as those described hereinafter) may be NOR gates or the like wherein all high level input signals produce a low level output signal. A high level signal may represent a binary "1" signal and a voltage relatively positive with respect to the low level signal which may represent a binary "0" signal and a voltage which is relatively negative. These signals are defined to be the "high" or "low" logic voltages for the specific gates. In a typical application, all unused gate inputs would be connected to the supply voltage through a suitable resistor. Furthermore, it should be understood that supply voltages are not shown in order to simplify the discussion and description of the circuit. Coupling capacitor 3 is connected from the output of gate 1 to the input of gate 2. Load resistor 4 is connected from the input of gate 2 to ground. The output of gate 2 is connected to the input of gate 1 via coupling capacitor 5. In addition, the output of gate 2 is coupled to one input of gate 7 via coupling capacitor 5. The aforesaid input of gate 7 is further connected to ground via load resistor 6. Another input of gate 7 is connected to gate input 9 which may be any suitable or desirable means for selectively supplying input signals to gate 7. The output of gate 7 is connected to output device 8 which may be any suitable device such as the memory portion of a printer or the like which requires control signals from the circuit.

The circuit portion to the left of the dashed line comprises the astable multivibrator circuit portion. Thus, assume that a relatively low level (e.g. ground level potential) transient signal is supplied to the input of gate 2. Gate 2 will produce a high level output signal (e.g. 5 volts). This signal is supplied via coupling capacitor 5 to an input of gate 1 whereby a low level signal is produced thereby. The low level signal from gate 1 is returned to the input of gate 2 via coupling capacitor 3. However, as coupling capacitor 5 becomes charged (in accordance with the RC time constant of resistor 6 and capacitor 5), the voltage across resistor 6 drops and, consequently, the potential level at the input of gate 1 is reduced. Ultimately, gate 1 receives a low level input signal and produces a high level output signal as a result thereof. This high level signal is coupled to gate 2 via coupling capacitor 3 such that gate 2 switches and produces a low level output signal. The time constant of resistor 4 and capacitor 3 determines the pulse duration at the input of gate 2.

Figure 3:
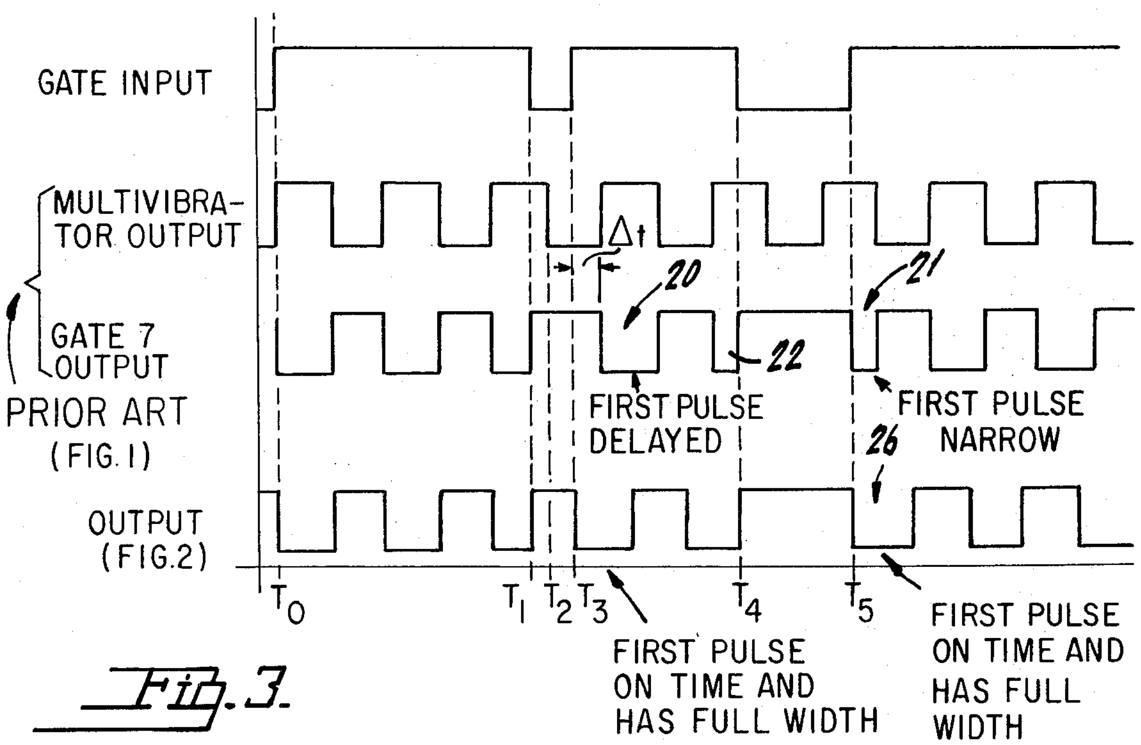
FIG. 3 is a timing diagram for the circuits shown in FIGS. 1 and 2.

As is seen in the idealized waveforms of FIG. 3, a uniform multivibrator output pulse train is produced by the multivibrator and supplied to an input of gate 7. So long as the input signal supplied by gate input 9 is a relatively high level signal, gate 7 operates as an inverter and transmits the multivibrator signal therethrough to output device 8.

However, when the gate input signal switches to the low level, as for example at time period T1 in FIG. 3, the input of gate 7 is clamped such that only a high level output signal is produced thereby. Immediately upon application of a low level gate input signal, the output signal produced by gate 7 switches to the high level regardless of the status of the multivibrator output signal. Thus, in the time period T1–T2 the gate output signal is a high level signal in spite of the high level input signal supplied by the multivibrator circuit. The gate output signal tends to follow the input control signal, not the multivibrator signal. This operation is acceptable on the trailing edge of the input control signal and may, in fact, be desirable for timely operation.

Contrariwise, with the initiation of the gate input signal (i.e. the gate input signal switches to the high level), the output of gate 7 is now dependent upon the multivibrator output signal supplied thereto. If the gate input signal starts (i.e. switches to the high level) during a negative portion of the multivibrator output signal, the gate output will remain high until the next change in multivibrator output signal level. In other words, a delay $\Delta t$ is inserted into the circuit operation (before the first pulse 20 occurs) while the circuit becomes synchronized in phase and frequency relationships with the signal from the multivibrator circuit. Synchronization with other circuitry, e.g. the control circuit, is no longer clearly established. For example, pulse 20 is delayed by the time $\Delta t$ until the multivibrator catches up with the input.

Conversely, if the gate input signal starts during any high level portion of the multivibrator output signal, the output of gate 7 immediately switches to the low level. Consequently, a pulse such as pulse 21 may be supplied by the output gate 7, which pulse is improperly formed, especially as regards time duration. In the event that output device 8 is sensitive to the time duration of a triggering signal (as most circuits are), an ambiguous or error situation could develop as a result. That is, an improperly formed pulse may (or may not) be of sufficient duration to trigger output device 8. Again, synchronization with the control circuit is lost.

Thus, it is seen that the output signal produced by output gate 7 is primarily a function of the multivibrator output signal. The phase relationship of the output signal and the input signal is ambiguous, at best, inasmuch as synchronization therebetween is not readily attained. This operation is not desirable.

Figure 2:
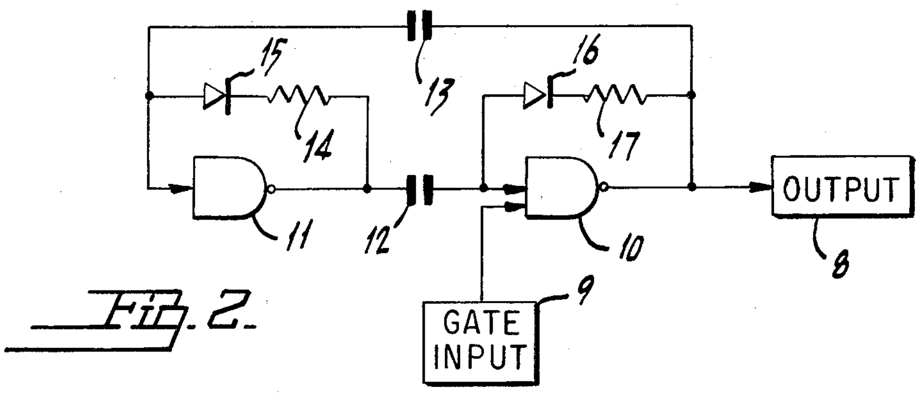
FIG. 2 is a block diagram of one embodiment of the instant invention.

Referring now to FIG. 2, there is shown a block diagram of one embodiment of the instant invention. This embodiment uses gate circuits which are similar to those described supra. Thus, the output of gate 11 is connected via coupling capacitor 12 to one input of gate 10. The output of gate 10 is connected to output device 8. In addition, the output of gate 10 is connected via coupling capacitor 13 to the input of gate 11. A feedback network comprising diode 15 and resistor 14 is connected from the output terminal of gate 11 to the input thereof with diode 15 coupled to be reverse biased by a high level output signal from gate 11.

A feedback network comprising diode 16 and resistor 17 is connected from the output terminal of gate 10 to an input terminal thereof. Diode 16 is poled to be reverse biased by a high level or relatively positive output signal from gate 10. Another input of gate 10 is connected to gate input source 9 whereby gate input signals are selectively supplied to the circuit to control the operation thereof.

Considering first the multivibrator action of the circuit, it is initially assumed that gate 10 receives all high level input signals. Thus, gate 10 produces a low level output signal. This low level signal is coupled to the input of gate 11 via coupling capacitor 13. Consequently, gate 11 produces a relatively high level output signal. This output signal is supplied to the input of gate 10 to complete the regeneration path. Without the feedback path, the charge on capacitors 12 and 13 would "run down" and the circuit would tend to not operate. However, the feedback network of resistor 17 and diode 16 operates as a discharge path for capacitor 12 when the output of gate 10 is low. When the output of gate 10 is high the feedback or discharge path of capacitor 12 is decoupled. Similarly, resistor 14 and diode 15 operate as a discharge path for capacitor 13 when the output of gate 11 is low. When the output of gate 11 is high, the feedback or discharge path of capacitor 13 is decoupled.

For example, as charge leaks from capacitor 12 through diode 16 and resistor 17, the voltage level at the input of gate 10 is reduced. When this input voltage falls below the threshold level for gate 10, the output signal produced thereby becomes a high level output signal. The high level signal is supplied to output device 8 and to the input of gate 11 via capacitor 13. Diode 16 prevents the application of this high level signal to the input of gate 10. Also, diode 16 is reverse biased such that capacitor 12 is no longer discharged therethrough.

The high level signal at the input of gate 11 causes a low level signal to be produced thereby, which signal is coupled to the input of gate 10. At this time, the charge on capacitor 13 leaks off through diode 15 and resistor 14 until the voltage at the input of gate 11 falls below the threshold level therefor. When the voltage at the input of gate 11 reaches the threshold level, gate 11 produces a high level output signal which is applied to the input of gate 10 via coupling capacitor 12. Diode 15 prevents the application of the high level signal to the input of gate 11. Also diode 15 is reverse biased by the high level output signal from gate 11 whereby capacitor 13 is no longer discharged. Thus, diodes 15 and 16 decouple the gate outputs from the associated inputs during free-running multivibrator operation described supra. During this free-running multivibrator operation, capacitors 12 and 13 are alternatingly charged and discharged. However, neither of the capacitors is ever fully discharged since the discharging path is blocked when the gates change state. In addition, it is impossible for both capacitors 12 and 13 to be in either the charged or discharged state at the same time. The two feedback paths provided by diode 15 and resistor 14 for gate 11 and diode 16 and resistor 17 for gate 10 prevent this occurrence. Since these concurrent capacitor charge states are prevented, the circuit can be gated on or off by using another input of one of the gates, as for example the input of gate 10 which is connected to gate input 9.

Referring to the timing diagram of FIG. 3, at time period T0 to the gate 10 input signal is shown to be a high level signal. It is initially assumed that the other input to gate 10 is also a high level signal whereby a low level signal is produced by gate 10 at time period TO. This output signal is supplied to output device 8 and, as well, via capacitor 13 to the input of gate 11. Gate 11 produces a high level output signal in response to the low level input signal. The high level signal produced by gate 11 is coupled via capacitor 12 to the other input of gate 10 thereby forming a regeneration path.

During the steady state operation capacitor 12 will discharge (at the gate 10 input side thereof) through diode 16 and resistor 17 to the low voltage output of gate 10. When capacitor 12 has discharged to the point where the voltage at the input of gate 10 is less than the switching threshold thereof, the output signal from gate 10 will rise to the high level. Diode 16 prevents the rapid rise of the gate 10 output signal from being coupled back to the input of gate 10. The high level output from gate 10 is coupled to output device 8 and, via capacitor 13, to the input of gate 11 whereby the output of gate 11 switches low. The low level output signal from gate 11 is coupled via capacitor 12 to the input of gate 10 completing the regeneration path. In the steady state condition, capacitor 13 is discharged through resistor 14 and diode 15 at the input of gate 11. Consequently, the input signal supplied to gate 11 switches to the low level whereby the output signal produced by gate 11 rises to the high level. This high level signal is coupled to the input of the gate 10 via capacitor 12 wherein a low level output signal is produced by gate 10. Also, this high level signal blocks diode 15 whereby capacitor 13 is no longer discharged. Obviously, from this type of operation a multivibrator type output signal described supra is produced at output 8.

At time period T1 the gate input signal to gate 10 switches to the low level. The low level input signal supplied by gate input 9 forces the output of gate 10 to be a high level signal and terminates the multivibrator operation. In some applications, it may be desirable to synchronize the negative going edge of the low level input signal with the positive going edge of the last pulse of the multivibrator signal. The high level signal produced by gate 10 will continue at least as long as the gate input signal is a low level signal. The high level output signal of gate 10 is coupled to the input of gate 11 via capacitor 13. This high level input signal exists at gate 11 until capacitor 13 discharges through diode 15 and resistor 14 to the gate 11 threshold voltage level at which time the output of gate 11 goes high and remains high thereby blocking the feedback path. The duration of this discharge or recovery period is a function of the capacitance of capacitor 13 and the resistance of resistor 14. The high level signal from gate 11 is coupled to the other input of gate 10 via capacitor 12. This input signal to gate 10 and the signal supplied to output device 8 will remain high so long as the signal from gate input 9 to gate 10 is maintained at the low level. That is, the feedback network including diode 16 is blocked by the high level signal at the output of gate 10. Meanwhile, capacitor 13 remains in a partially charged condition.

The output of gate 11 is coupled to the input thereof via the feedback network consisting of diode 15 and resistor 14 so that gate 11 remains in a relatively unstable condition. The instability of gate 11 maintains capacitors 12 and 13 in a partially charged state and prevents the capacitors from "running-down." Moreover, this operation tends to keep the input of gate 11 close to the switching threshold thereof over steady state operation.

As noted, the high level output signal produced by gate 11 is supplied to the other input of gate 10 immediately after the recovery period for capacitor 13. Consequently, when the gate input signal supplied to gate 10 from input 9 switches from the low to the high level at time period T3 the output of gate 10 immediately switches low inasmuch as all high level input signals are supplied thereto. This low level output signal is coupled to the input of gate 11 via capacitor 13 and the standard multivibrator operation of the circuit, as described supra, occurs. Thus, immediately upon the initiation (i.e. positive going edge) of the gate input signal the multivibrator operation is resumed whereby the first output pulse 25 is produced concurrent with the initiation of the input signal. Because of this multivibrator operation of the circuit, the first pulse 25 is of the full standard width.

Again, at time period T4 the input signal switches to the low level thereby forcing gate 10 to produce a high level output signal. A high level output signal from gate 10 is maintained so long as the gate input signal is a low level signal. The gate input signal supplied at time period T4 is prolonged relative to the input signal provided at time period T1 for illustrative purposes only. Thus, when the input signal switches to the high level at time period T5, output pulse 26 is produced on time and of full time duration. It is immaterial as to the occurrence of the gate input signal during any particular portion of the output signals and cycle. The appropriate output signal is a full pulse produced by the multivibrator circuit portion and synchronized with the gate input signal. The only requirement is that a recovery period wherein capacitor 13 discharges and gate 11 produces a high level output signal is provided.

Thus, there is described a multivibrator which can be selectively started and stopped without alteration of the output signal produced thereby. This circuit can be used as a square wave oscillator even in applications wherein DC voltages are ramped instead of stepped. Furthermore, this circuit may be used as a burst oscillator or a timing pulse generator which can be selectively synchronized to an input signal or the like. Of course, these suggested applications are not intended to be limitative but are illustrative only.

Figure 4:
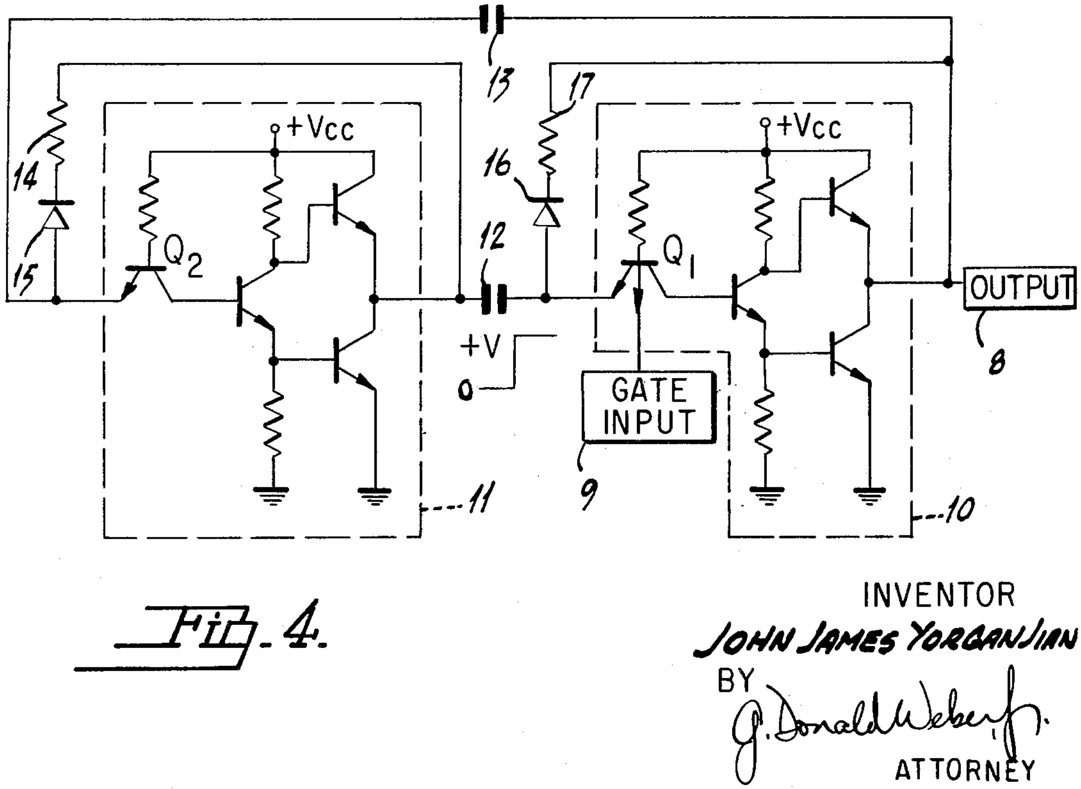
FIG. 4 is a schematic diagram of one embodiment of the instant invention.

Referring now to FIG. 4, there is shown a schematic diagram of one embodiment of the invention. In the schematic diagram of FIG. 4, all elements which are similar to elements described elsewhere bear similar reference numerals. The circuits shown in gates 10 and 11 (represented by dashed outline) are standard circuits which are known in the art. These standard circuits form no part of the instant invention, per se. However, FIG. 4 is included herein to suggest one application of the instant invention.

Transistor Q1 of gate 10 is shown as a multi-emitter transistor to which the input signals are supplied. Transistor Q2 of gate 11 may also be a multi-emitter electrode transistor wherein the emitter electrodes which are not connected to the circuit per se are connected to a high level source as is standard practice in the art.

Having thus described the preferred embodiments of the instant invention, it is understood that these embodiments are illustrative only. The embodiments are not meant to be limitative and modifications thereof may become apparant to those skilled in the art. However, any modifications which fall within the purview of this invention are intended to be included within the scope thereof.

What is claimed is:

1. In combination, a plurality of gate circuit means each having input and output terminals, the output terminal of each gate circuit means coupled to an input terminal of a different gate circuit means, a plurality of feedback means, each of said feedback means associated with a respective one of said gate circuit means and including diode means connected between the output terminal of the associated gate circuit means and an input terminal thereof, said diode means connected to permit the level of an input signal to approach the signal level at the output terminal, input means connected to a further input terminal of one of said gate circuit means, and output means connected to the output terminal of the same said one of said gate circuit means to which said input means is connected.

2. The combination recited in claim 1 wherein said plurality of gate circuit means includes first and second gating circuit means, said feedback means including a DC feedback path, said DC feedback path arranged so that at least one of said first and second gating circuit means is unstable in the absence of an input signal at said input means.

3. The combination recited in claim 1 wherein said feedback means includes resistor means connected in series with said diode means, and capacitor means connected from said output terminals to said input terminals to provide AC coupling between said gate circuit means.

4. The combination recited in claim 1 wherein at least one of said gate circuit means has a plurality of input terminals, said input means being connected to one input terminal of that one of said gate circuit means.

5. The combination recited in claim 1 wherein said gate circuit means comprise a multivibrator circuit for supplying regularly recurring signals, said input means selectively supplies signals to one of said gate circuit means to alter the rate of said regularly recurring signals while retaining synchronism between the regularly recurring signals and an input signal from said input means.

6. The combination recited in claim 5 wherein said multivibrator circuit includes a pair of interconnected gate circuit means, said feedback means rendering said gate circuit means unstable in steady-state operation, and the coupling means connected between said gate circuit means transfer signals from one to another of said gate circuit means to control the operation thereof in the absence of an input signal from said input means.

* * * * *